US006509934B1

(12) United States Patent
Bao et al.

(10) Patent No.: US 6,509,934 B1
(45) Date of Patent: Jan. 21, 2003

(54) DIRECTING AN ANTENNA TO RECEIVE DIGITAL TELEVISION SIGNALS

(75) Inventors: Jay Bao, Bridgewater, NJ (US); Victor Sinyansky, Bridgewater, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/219,060

(22) Filed: Dec. 22, 1998

(51) Int. Cl.[7] .......................... H04N 5/50; H04N 5/44; H04H 1/00; H04B 17/00; H04B 7/14

(52) U.S. Cl. ...................... 348/570; 348/725; 348/731; 348/732; 348/733; 342/359; 455/3.02; 455/67.1; 455/67.3; 455/25; 455/226.1; 455/226.2

(58) Field of Search ............................... 348/570, 731, 348/732, 733, 725, 21, 674; 342/74, 75, 77, 359; 375/232; 455/67.1, 25, 67.2–67.7, 3.02, 226.1, 226.2, 67.3; 725/72

(56) References Cited

U.S. PATENT DOCUMENTS 3,842,420 A * 10/1974 Rabow ...................... 343/117
4,030,099 A * 6/1977 Valenti et al. .............. 343/117
4,696,053 A * 9/1987 Mastriani et al. ............ 455/67
5,053,784 A * 10/1991 Hippelainen ................ 342/434
5,461,305 A * 10/1995 Kim ........................ 324/76.11
5,797,083 A * 8/1998 Anderson .................... 455/25
5,983,071 A * 11/1999 Gagnon et al. .............. 455/3.2
6,011,511 A * 1/2000 Chuong et al. ............. 342/359
6,107,958 A * 8/2000 Kelkar et al. ............... 342/169
6,201,954 B1 * 3/2001 Soliman .................. 455/226.2

* cited by examiner

*Primary Examiner*—John Miller
*Assistant Examiner*—Paulos M. Natnael
(74) *Attorney, Agent, or Firm*—Dirk Brinkman; Andrew J. Curtin

(57) ABSTRACT

An antenna is directed to optimally receive an advanced television signal. First, the strength of the signal is measured as a function of the azimuth angle of the antenna, and second the flatness of the signal is measured as a function of the azimuth angle of the antenna. The antenna is then rotated to maximize the flatness of the signal while maintaining the strength of the signal above a minimum threshold.

11 Claims, 5 Drawing Sheets

DIRECTING AN ANTENNA TO RECEIVE DIGITAL TELEVISION SIGNALS

FIELD OF THE INVENTION

This invention relates generally to the field of directing antennas, and more particularly, to directing an antenna to receive digital television signals.

BACKGROUND OF THE INVENTION

Conventional Television Signal

FIG. 1 shows a distribution of energy versus frequency for a conventional television (TV) signal 100, for example, NTSC, PAL, or SECAM. The signal 100 includes three energy peaks, one for video 110, one for color 120, and one for sound 130. As can be seen, conventional television transmitters concentrate most of the energy of the radio frequency (RF) signal in a relatively narrow bandwidth near the frequency of the picture sub-carrier, i.e., ~1 MHz. Therefore, an antenna designed to receive conventional (terrestrial-based analog) TV signals can usually be directed for optimal reception of the video portion by only considering the strength of the signal.

Advanced Television Signal with Interference

FIG. 2 shows a distribution of energy versus frequency for an advanced television (ATV) signal 200. An advanced television signal can concurrently carry a variety of multi-media content, for example, HDTV, conventional TV, video-text, audio, low-bandwidth TV, etc. In the ATV signal 200, the energy of the signal, at the transmitter, is distributed substantially uniformly over the entire channel bandwidth, usually 6 MHz. With such a wide spectrum signal, the probability of destructive ghost interference is significantly higher than in the case of conventional TV that has a narrow spectrum signal. As a result, static and dynamic multi-path fading are more likely to corrupt the spectrum of the received ATV signal than in the case of the conventional TV signal. This interference is shown by "notches" 201–202 in FIG. 2.

Multi-Path Fading

Multi-path fading is a result of mostly two effects. The first effect is caused by variations in the index of refraction due to spatial and temporal variations in temperature, pressure, humidity, and turbulence in the atmosphere. These varying atmospheric conditions result in multiple paths from the transmitter to the receiver, each path having a different effective electrical length. The second effect is due to the reflection of the RF signal from different obstacles or objects in the signal path. The second effect produces a more stable multi-path environment when the obstacles or objects are stationary. In either case, the signals arriving at the antenna via different length electrical paths interfere with each other.

It is possible to describe the effect of multipath fading on a passband signal as a superposition of a number of electromagnetic waves. For an ATV terrestrial signal, the highest passband frequency is, for example, 6 MHz. The delay along multiple paths can be in the range of −2 to +25 $\mu$s.

The notches 201–202 in the power spectrum will happen when several components of the signal approach the receiver at the same passband frequency but different phases. The depth of a notch can be equal to the full power when the two paths are nearly the same amplitude but opposite phase. In this case, destructive interference results in zero energy at this point in the power spectrum. The ATV receiver cannot process the signal and the receiver effectively becomes inoperative.

Anecdotal evidence has digital television receivers from different manufacturers standing side-by-side in a retail store, each hooked-up to the same antenna, some working perfectly, others totally inoperative. Attempts to "tune" the sets based on built-in signal strength meters frequently are futile or give inconsistent and unpredictable results.

Consequently, in order to determine the optimum direction of a receiving antenna for an ATV receiver, the strength of the received signal alone is not enough to determine the optimal antenna direction. Therefore, it is desired to provide a method and apparatus which can direct an antenna to optimally receive advanced television signals.

SUMMARY Of THE INVENTION

Provided is a method and apparatus for measuring the strength and quality of a digital television signal. The measured values can be used to optimally direct an antenna to an orientation which maximizes the quality of the signal.

Specifically, the invention measures the strength of the signal as a function of the azimuth angle of the antenna. This can be done in the tuner section of a television receiver using an automatic gain control circuit. The flatness of the signal, as a function of the azimuth angle of the antenna, is measured in an adaptive equalizer of the receiver.

These two measured values can be displayed on the screen of the receiver, and the antenna can be adjusted to maximize the flatness of the signal while maintaining the strength of the signal above a minimum threshold. Alternatively, the antenna can be automatically adjusted.

DETAILED DESCRIPTION OF PREFERRED EMBODIMENTS

Introduction

In order to optimally direct an antenna to receive quality advanced television signals, our invention measures, as a function of the azimuth angle of the antenna, both the flatness and signal strength of the received signal. We believe that these two measurements, in combination, can be used as indicators for optimally directing the orientation of a television antenna.

Signal Strength and Flatness

Figure 1:
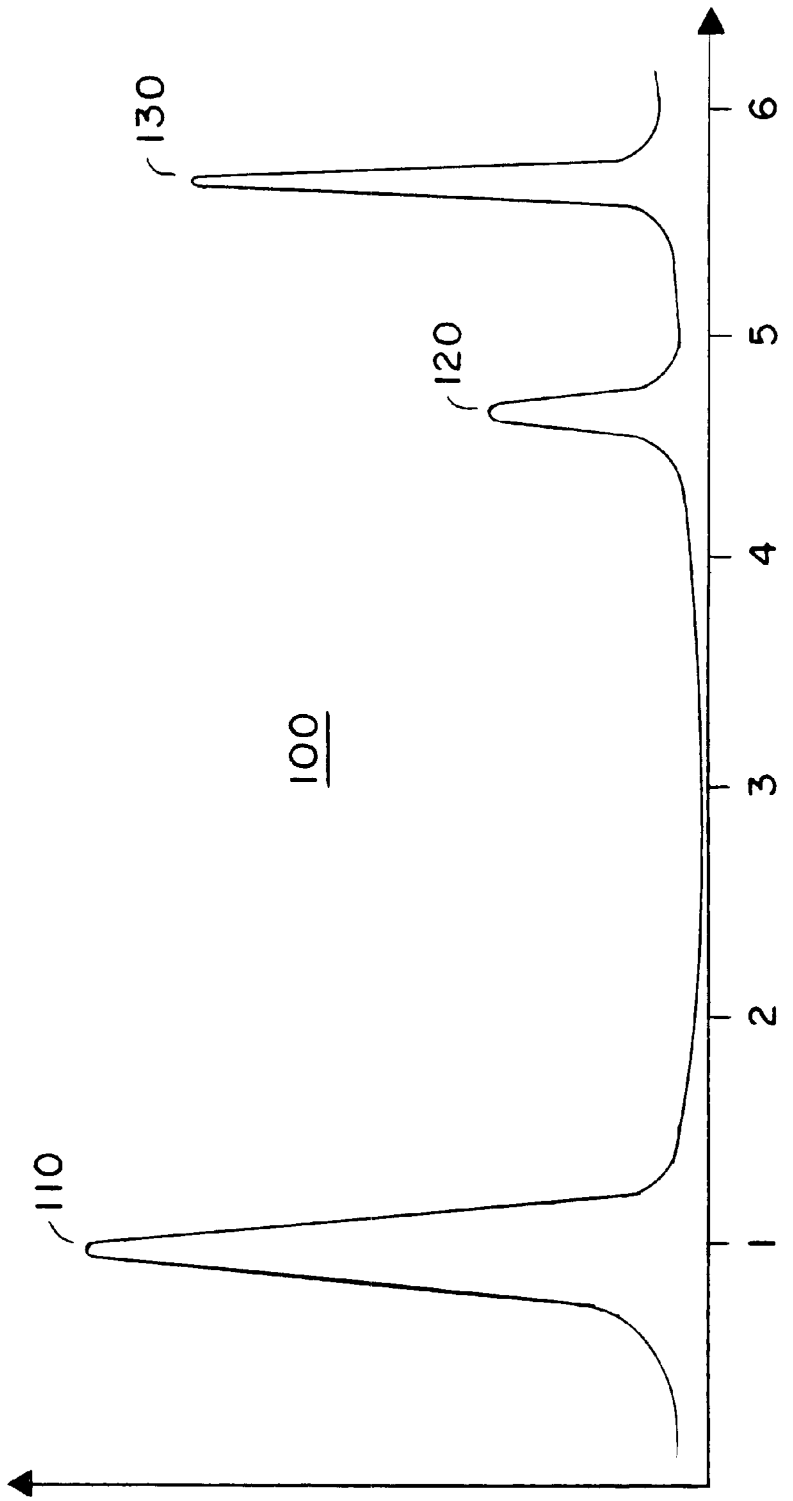
FIG. 1 diagrams energy distribution for a conventional television signal.
Figure 2:
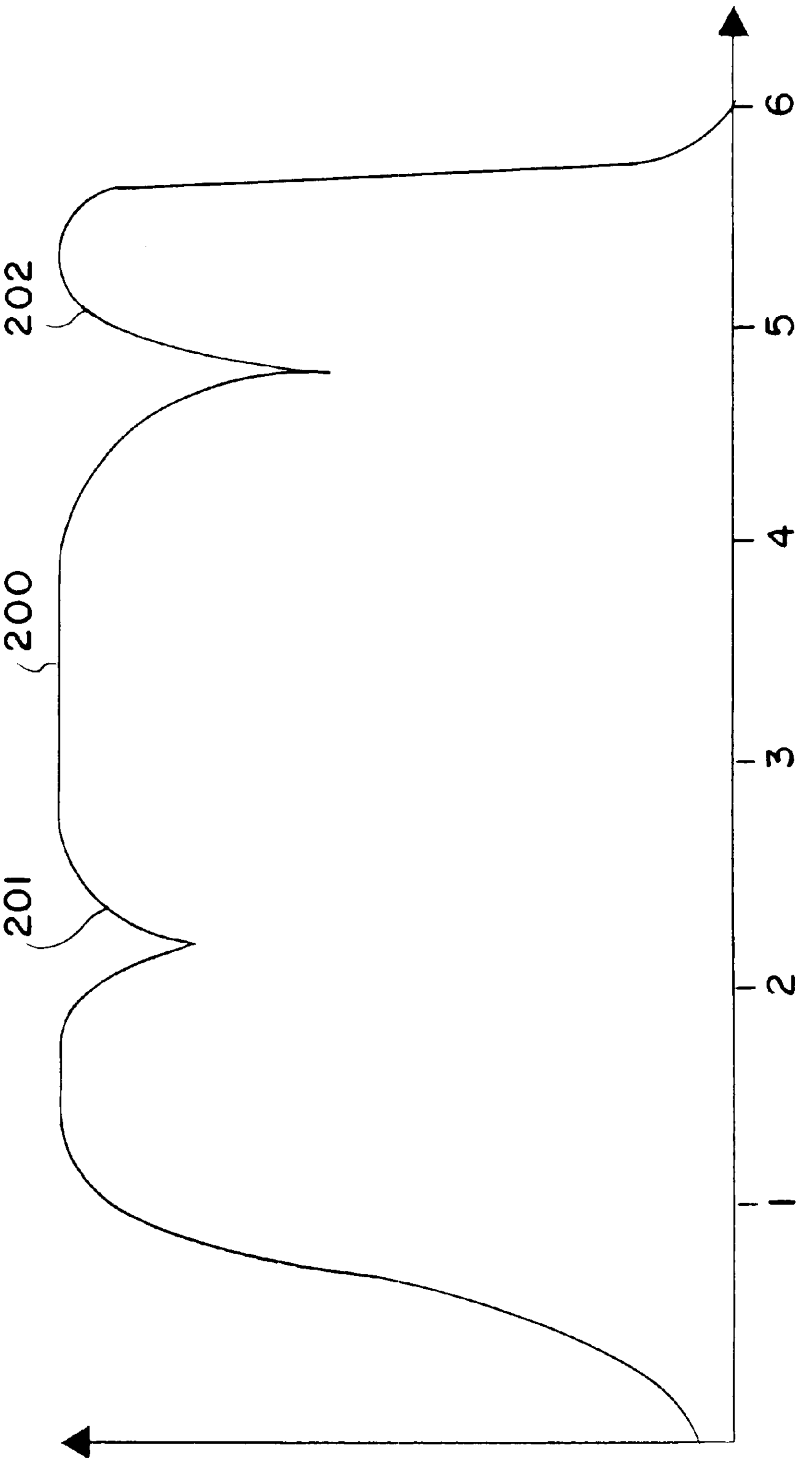
FIG. 2 diagrams energy distribution for an advanced television signal.
Figure 3:
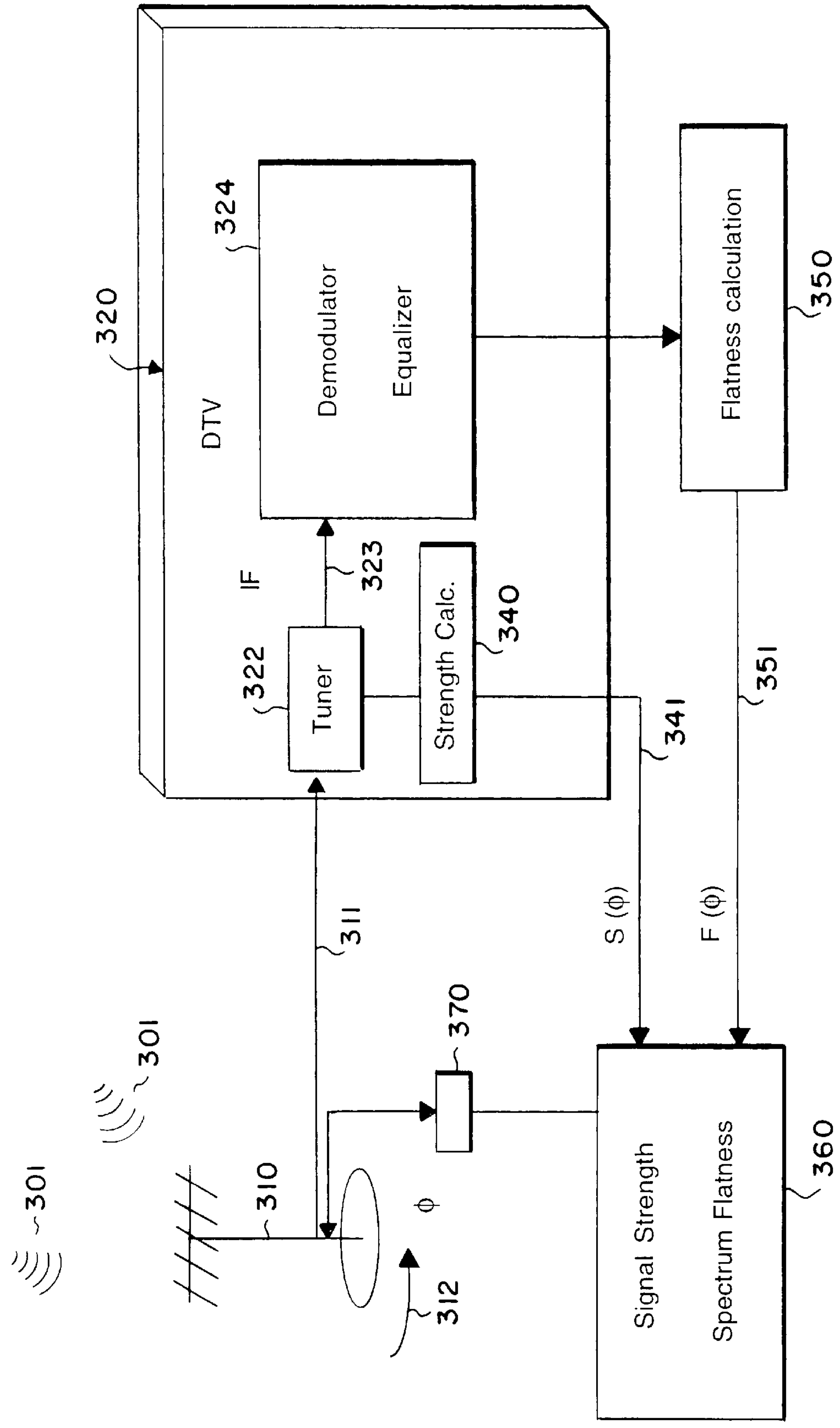
FIG. 3 is a block diagram of a system that uses the antenna directing technique according to the invention.

As shown in FIG. 3, an antenna 310 is connected to an advanced television receiver (ATV) 320 by line 311. The ATV 320 includes a tuner 322 connected to a demodulator and equalizer 324 by line 323.

During operation, the antenna receives a radio frequency (RF) signal 301. As stated above, the signal 301 can be received via multiple electrical paths. The tuner 322 produces an intermediate frequency (IF) signal on line 323. The IF signal is processed by the demodulator and equalizer 324.

In accordance with our invention, the ATV 320 includes means 340 and 350 for determining the strength S(Φ) and flatness F(Φ) of the received signal, respectively. The angle Φ is the azimuth angle 312 of the antenna.

The strength can be measured as an automatic gain control (AGC) level within the tuner 322. Techniques for doing this calculation are well known. According to a preferred embodiment of our invention, the flatness of the signal is measured from the energy of the ATV demodulator and equalizer 324 as described in greater detail below.

Displaying Signal Quality as a Function of Azimuth Angle

The relative strength 341 and flatness 351, i.e., S(Φ) and F(Φ), can be displayed as, for example, bars or numeric quantities on the television screen 360. The condition of a maximum flatness of F(Φ), along with the strength S(Φ) being greater than a minimum threshold value, is an indicator for the optimum direction of the antenna 310.

It should be noted, that our method of finding the optimum position for the antenna can be used for an automatic optimum direction tracking system as well. For example, the same signals (341 and 351) that are displayed on the screen 360 can be used to control a motor 370 for rotating the antenna to maintain maximum flatness while keeping the strength above the minimum threshold.

In a preferred embodiment of our invention, we use an adaptive equalizer 324 as is found in ATV receivers. Following the ATSC guidelines for U.S. terrestrial digital TV broadcast, a suggested equalizer architecture 324 is in the form of a T-spaced decision feedback type, where T is the sample period. The total number of taps typically is 256, with 64 taps for a feed forward section, and 192 taps for a feedback section. We can measure the output of the equalizer 324 in both "blind" and "decision directed" modes. We use a least mean square (LMS) summation to update correction coefficient; the update rate can be 1/T.

Measuring Signal Flatness

Figure 4:
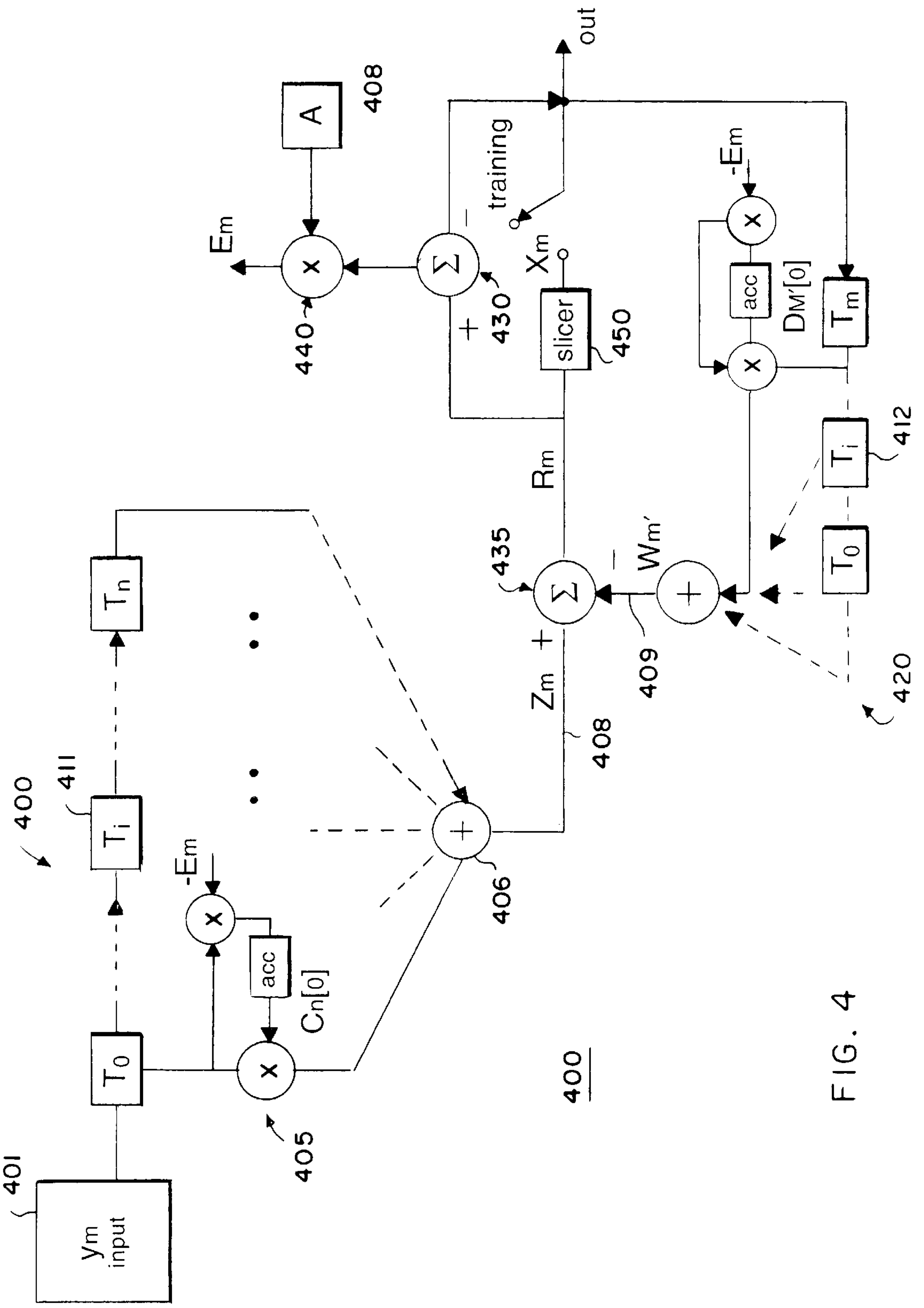
FIG. 4 is a circuit diagram of a preferred embodiment of the invention.

FIG. 4 shows a circuit 400 for determining the flatness of the received digital television signal 301. The main components required are as follows. A first delay line 410 produces a feed forward error correction signal (FFE) using finite impulse resonance (FIR) filters. The delay line 410 includes taps ($T_i$) 411. A second delay line 420, also using FIR filters, produces a decision forward error correction signal (DFE) at taps ($T_j$) 412. The circuit 400 also includes error calculation logic 430, coefficient update logic 440, and a slicer 450.

During operation of the circuit, an input signal sequence $Y_m$ 401 is propagated through the taps 411 of the first delay line 410. At each tap, the propagated signal is multiplied by circuit 405 by a filter coefficient $C_m$. The products of all taps 411 are summed by circuit 406 together to form the FFE as:

$$Z_m=\Sigma_m\ (Y(n)*C(n-m)),$$

for m equal to 1 to n, where n is the total number of taps of the delay line 410.

Similarly, the DFE produced by the second delay line 420 can be expressed as:

$$W_{m'}=\Sigma_{m'}(X(m')*D(n'-m')),$$

for m'=n', . . . , 1, and where n' is the number of taps for the DFE 420.

The DFE ($W_m$) on line 409 is subtracted from the output FFE ($Z_m$) on line 408 by circuit 435. The signals Xm and Dm are inputs and filter coefficients, respectively to the DFE 420. The result of the mean square of the subtraction over all n taps is expressed as:

$$Rm=\text{avg}\ [(Zm-Wm)^2]$$

This result is fed to a decision device, for example the slicer 450, where the result is compared to a set of expected values. The output of the slicer 250 (Xm) is fed to the DFE 420.

In addition, a difference between the input and output of the slicer 450 is determined, and this difference (Rm) is the total decision error. This error is then multiplied by an adaptation factor (A) 480 to form the adjustment value (Em=Rm·A) for the next set of coefficients for both the FFE and DFE as follows:

$$Cm+1=Cm+Em\cdot Y(m)=Cm+A\cdot Rm\cdot Ym$$

$$Dm+1=Dm+A\cdot Rm\cdot X(m)=Dm+Em\cdot X(m)$$

The factor A 480 is constant over all the coefficients for a given cycle, but can be adjusted as the convergence of the equalizer progresses.

Operating Modes

The circuit 400 according to our design can operate in two modes. When the DFE 420 is operating using the output of the slicer as its input, the equalizer is said to be running in blind mode. When DFE 420 is using a known training sequence as its input, then the equalizer is in a decision directed mode.

The result continues to approach an equilibrium state until a minimum Rm is reached. For a noise-free and inter-symbol-interference-free ideal signal, the energy of the FIR is concentrated on one "center" tap, e.g. only this tap has a non-zero coefficient, and all other coefficients should be zero or minimal.

However, when the input signal is distorted due to multipath or other impairments, there will be an appreciable amount of non-zero terms among the tap coefficients corresponding to the distortion position in the time domain.

Figure 5:
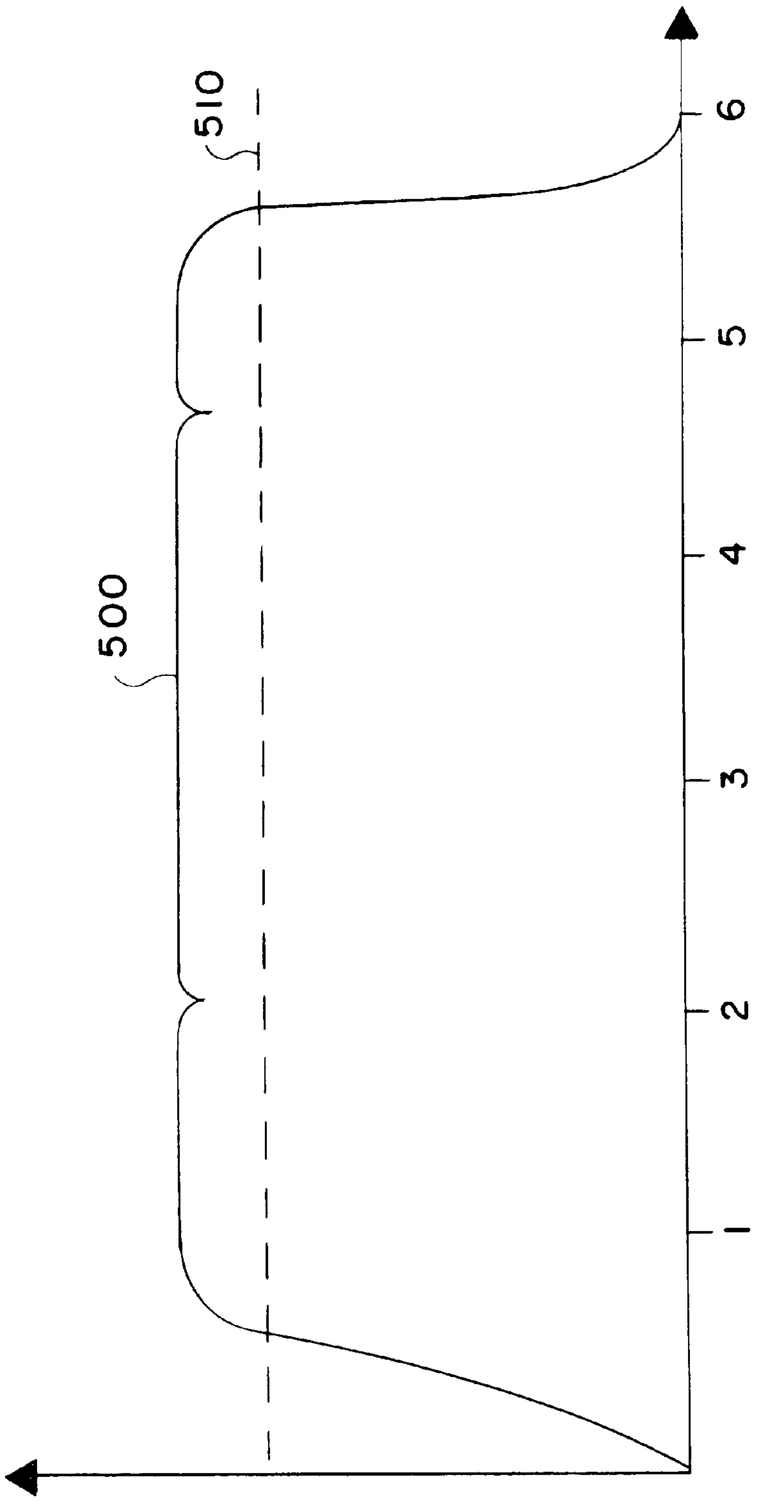
FIG. 5 is a diagram of a signal received to maximize flatness.

If the squared sum of all filter coefficients is defined as the energy parameter of the equalizer, normalized to the center tap, then the optimal reception direction can be determined by finding the minimum of this parameter for a signal strength which is above threshold. FIG. 5 shows a signal 500 received via an antenna directed according to the invention. The signal has a maximum flatness while still maintaining the signal strength over a minimum threshold 510.

It should be understood that other means and methods for determining the strength and flatness of a digital television signal can also be used. For example, the antenna can be in the form of a phased-array.

This invention is described using specific terms and examples. It is to be understood that various other adaptations and modifications may be made within the spirit and scope of the invention. Therefore, it is the object of the appended claim to cover all such variations and modifications as come within the true spirit and scope of the invention.

We claim:

1. A method for directing an antenna to receive an advanced television signal, comprising the steps of:

measuring the strength of the signal as a function of the azimuth angle of the antenna;

measuring the flatness of the signal as a function of the azimuth angle of the antenna;

rotating the antenna to maximize the flatness of the signal while maintaining the strength of the signal above a minimum threshold.

2. The method of claim 1 wherein the strength of the signal is measured in a tuner of a television receiver, and the flatness is measured in an equalizer of the television receiver.

3. The method of claim 2 wherein the strength is measured in an automatic gain control of the tuner.

4. The method of claim 2 wherein the flatness is measured in an adaptive equalizer including a plurality taps forming a feed forward section and a feed back section.

5. The method of claim 4 wherein the feed forward section produces a feed forward error correction signal, and the feedback section produces a decision forward error correction signal.

6. The method of claim 5 wherein a total error signal is derived from the feed forward and decision forward error correction signals, the total error signal being proportional to the flatness of the signal.

7. The method of claim 1 wherein the signal strength and flatness are displayed on a screen of the television receiver.

8. The method of claim 1 wherein the direction of the antenna is automatically adjusted over time to maintain maximum flatness while maintaining the strength of the signal above the minimum threshold.

9. An apparatus for directing an antenna to receive an advanced television signal, comprising:

means for measuring the strength of the signal as a function of the azimuth angle of the antenna;

means for measuring the flatness of the signal as a function of the azimuth angle of the antenna;

a motor rotating the antenna to maximize the flatness of the signal while maintaining the strength of the signal above a minimum threshold.

10. A method for directing an antenna to receive an advanced television signal, comprising the steps of:

first measuring the strength of the signal, in an automatic gain control circuit of a receiver, as a function of the azimuth angle of the antenna, and the flatness of the signal, in an equalizer of the receiver, as a function of the azimuth angle of the antenna; and second, in response to the measuring, rotating the antenna to maximize the flatness of the signal while maintaining the strength of the signal above a minimum threshold.

11. An apparatus for directing an antenna to receive an advanced television signal, comprising:

an automatic gain control circuit configured to measure the strength of the signal as a function of the azimuth angle of the antenna;

an equalizer configured to measure the flatness of the signal as a function of the azimuth angle of the antenna; and means, responsive to the measuring, configured to rotate the antenna to maximize the flatness of the signal while maintaining the strength of the signal above a minimum threshold.

* * * * *